United States Patent [19]

Kinoshita et al.

[11] Patent Number: 5,087,648

[45] Date of Patent: Feb. 11, 1992

[54] METHOD OF PROVIDING FLUIDIZING PROPERTY TO HYDRAULIC CEMENT COMPOSITIONS USING CEMENT DISPERSION AGENTS COMPRISING WATER SOLUBLE VINYL COPOLYMER

[75] Inventors: Mitsuo Kinoshita; Toshihide Shimono; Shozo Yamaguchi; Tsuneo Yamamoto, all of Aichi, Japan

[73] Assignee: Takemoto Yushi Kabushiki Kaisha, Aichi, Japan

[21] Appl. No.: 528,686

[22] Filed: May 24, 1990

Related U.S. Application Data

[62] Division of Ser. No. 296,974, Jan. 17, 1989, Pat. No. 4,962,173.

[30] Foreign Application Priority Data

Mar. 4, 1988 [JP] Japan ................... 63-52344

[51] Int. Cl.$^5$ .............................. C04B 24/16
[52] U.S. Cl. ........................ 524/3; 106/725; 106/809
[58] Field of Search .............. 526/229, 240, 287; 524/3

[56] References Cited

U.S. PATENT DOCUMENTS 4,808,641 2/1989 Yagi ........................ 524/5

Primary Examiner—Christopher Henderson
Attorney, Agent, or Firm—Heller, Ehrman, White & McAuliffe

[57] ABSTRACT

Fluidizing property is provided to a hydraulic cement composition by adding a cement dispersion agent to the composition by 0.01-2 weight % with respect to its solid cement component. The cement dispersion agent contains a water-soluble vinyl copolymer which is obtainable by copolymerization of at least first monomer shown by Formula A given below, second monomer shown by Formula B given below and third monomer shown by Formula C given below at copolymerization rate of 10-50/3-25/80-40 by weight:

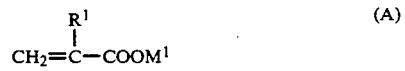

(A)

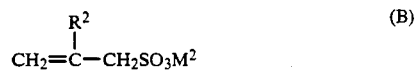

(B)

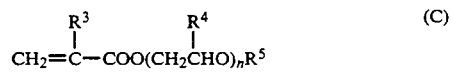

(C)

where $R^1$, $R^2$, $R^3$ and $R^4$ are H or $CH_3$, $R^5$ is alkyl group with 1-3 carbon atoms, $M^1$ and $M^2$ are alkali metal, alkali earth metal, ammonium or organic amine, and n is an integer in the range 5-25. Such a dispersion agent is produced by aqueous solution polymerization of monomers of these kinds at a weight ratio within the range given above in the presence of a radical polymerization initiating agent.

13 Claims, No Drawings

METHOD OF PROVIDING FLUIDIZING PROPERTY TO HYDRAULIC CEMENT COMPOSITIONS USING CEMENT DISPERSION AGENTS COMPRISING WATER SOLUBLE VINYL COPOLYMER

This is a division of application Ser. No. 07/296,974 filed Jan. 17, 1989, now U.S. Pat. No. 4,962,173.

BACKGROUND OF THE INVENTION

This invention relates to methods of providing fluidizing property to hyraulic cement compositions using cement dispersion agents comprising water soluble vinyl copolymer.

Hydraulic cement compositions such as concrete are a mixture of cement, gravel, sand, etc. kneaded together with water and harden by hydration of cement and a dispersant is frequently used as an adjuvant for this process. A dispersing agent is for improving workability, accelerating the hydration reaction of cement and for causing water reducing effects by improving dispersion and fluidity characteristics of cement particles in water such that the strength of concrete, etc. can eventually be improved. For this reason, a cement dispersion agent must satisfy the following requirements: (1) dispersion and fluidity of cement particles must be large, (2) Change in the dispersion and fluidity characteristics over time must be small (or the slump loss must be small), (3) There is no excessive entrained air which may lead to the lowering of the strength of hardened concrete, and (4) It must be economical.

In the past, many proposals such as lignin sulfonates, hydroxy carboxylates, condensation products of naphthalene sulfonic acid and formaldehyde, condensation products of aromatic sulfonic acid and formaldehyde, condensation products of melamine sulfonic acid and formaldehyde, etc. have been made as cement dispersion agent. It is known, however, that each of these has not only its own advantages but also its own significant problems.

On the other hand, there have been proposals for making use of water-soluble vinyl copolymers as cement dispersion agents (Japanese Patent Publication Tokko 59-18338, Japanese Patent Publications Tokkai 62-70252, 62-78137 and 62-212252 and U.S. Pat. Nos. 4,036,660, 4,076,699 and 4,473,406). Although some of the already proposed water-soluble vinyl copolymers have superior characteristics related to dispersibility and fluidity initially, changes in these characteristics with time are large with these prior art water-soluble vinyl copolymers. Moreover, their production process is too complicated to be practical.

Water-soluble vinyl copolymers are produced by copolymerization of various vinyl monomers in water. In order that the water-soluble vinyl copolymer thus produced can be fully usable as a cement dispersion agent, however, polar groups capable of adsorbing to cement particles to provide dispersion and fluidity effects such as carboxylic acid group, sulfonic acid group and polyoxyalkylene group must be present within the copolymer chain at appropriate density ratios and it is also required that the copolymer have an appropriate molecular weight. If a water-soluble vinyl copolymer is produced by copolymerization in a water solution, however, those with molecular weights too large to be desirable for a cement dispersion agent tend to be produced. It is known for the purpose of adjusting the molecular weight of a water-soluble vinyl copolymer to use as a part of the solvent a chain transfer agent such as a water-soluble thiol compound such as thioglycolates and thioglycerine or a lower alcohol such as methanol and isopropanol. It is also known, for adjusting the molecular weight without using a chain transfer agent, to raise the polymerization temperature nearly to the boiling point of the solvent. If a water-soluble thiol compound is used as a chain transfer agent, however, a bad odor often stays with the produced water-soluble vinyl copolymer and it also tends to decay in storage. In order to prevent them, a complicated refinement process is required. If use is made of a lower alcohol as a part of the solvent, on the other hand, a large amount of the lower alcohol tends to remain within the produced water-soluble vinyl copolymer, adversely affecting the efficacy as cement dispersion agent. If the polymerization temperature is raised nearly to the level of the boiling point of the solvent, furthermore, it becomes extremely difficult to control the heat of polymerization and the speed of polymerization reaction, thereby adversely affecting workability and safety of operation and causing defects and irregularities in the quality of produced water-soluble vinyl copolymer.

SUMMARY OF THE INVENTION

It is therefore an object of the present invention in view of the above to eliminate the problems described above by providing and methods of providing fluidizing property to hydraulic cement compositions using such a cement dispersion agent comprising water soluble vinyl copolymer.

The present invention has been completed by the present inventors with the knowledge of the background as desoribed above as a result of diligent studies of methods for adjusting molecular weight for the purpose of producing water-soluble vinyl copolymers with appropriate molecular weights for a cement dispersion agent. The present invention is based on the inventors' discovery that, although there is no effect at all if other sulfonic vinyl monomers are used as copolymerized monomers, the molecular weight of water-soluble vinyl copolymers obtained by polymerization in water solution by using an appropriate amount of allylsulfonate or methallyl sulfonate as copolymerized monomers can be adjusted appropriately even without any special process as described above for adjusting the molecular weight, that sulfonic acid group can be appropriately introduced into a water-soluble vinyl copolymer obtained with allylsulfonate or methallyl sulfonate participating in the polymerization reaction, and that dispersion and fluidity characteristics can be improved and changes thereof with time can be reduced by providing a water-soluble vinyl copolymer simultaneously having a desired molecular weight on the one hand and an appropriate ratio with other polar groups on the other hand.

DETAILED DESCRIPTION OF THE INVENTION

The present invention relates to a method of providing fluidizing property to a hydraulic cement composition comprising the step of adding a cement dispersion agent to the composition by 0.01–2 weight % with respect to the solid cement component thereof, this cement dispersion agent comprising a water-soluble vinyl copolymer which is obtainable by copolymerization of at least first monomer shown by Formula A given below, second monomer shown by Formula B given below and third monomer shown by Formula C below at copolymerization ratio of 10-0.50/3-25/80-40 by weight:

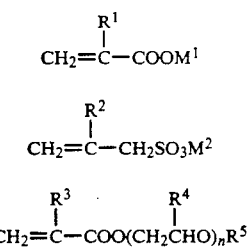

where $R^1$, $R^2$, $R^3$ and $R^4$ are H or $CH_3$, $R^5$ is alkyl group with 1-3 carbon atoms, $M^1$ and $M^2$ are alkali metal, alkali earth metal, ammonium or organic amine, and n is an integer in the range of 5-25.

Examples of monomer shown by Formula A according to the present invention include alkali metal, alkali earth metal and alkanol amine salts of acrylic acid and methacrylic acid. Examples of monomer shown by Formula B include alkali metal, alkali earth metal and alkanol amine salts of allylsulfonic acid and methallylsulfonic acid. Examples of monomer shown by Formula C include esterified compounds of monoalkoxy polyalkylene glycol such as methoxy polyethylene glycol, ethoxy polyethylene glycol, propoxy polyethylene glycol, isopropoxy polyethylene glycol, methoxy polyethylene polypropylene glycol and ethoxy polyethylene polyprolylene glycol with acrylic acid or methacrylic acid and use may be made of those which have 5-25 moles of polyalkylene glycol added and are soluble in water or in warm water. In this situation, the ratio of hydrophylic polyethylene glycol chain in the polyalkylene glycol chain or the added number of moles is appropriately selected within the range given above in order to make the aforementioned esterified compound sufficiently soluble in water or in warm water.

It is important that the ratio of the three types of monomers shown by Formulas A, B and C should be within the range of 10-50/3-25/40-80 by weight. If use as cement dispersion agent is made of a water-soluble vinyl copolymer made with this ratio outside the aforementioned range, dispersion and fluidity characteristics may be insufficient, the slump loss may be too large or the air content may be too large such that the originally intended effect cannot be obtained. In order to have better results, the aforementioned ratio should be selected within the range given by 20-35/5-15/55-75 by weight.

Of the three types of monomers according to the present invention, the monomer shown by Formula B is particularly important from the point of view of adjustment of molecular weight and the functional capability of the water-soluble vinyl copolymer which is obtained. Although vinyl copolymers produced only from monomers shown by Formulas A and C exhibit certain dispersion and fluidity characteristics, their change with time is great and this presents a serious problem from a practical point of view. If monomer shown by Formula B is also added as taught by the present invention, by contrast, dispersion and fluidity become large and the change in these characteristics with time also becomes extremely small.

Next, a method of producing water-soluble vinyl copolymers of the present invention is explained. First, monomers shown by Formulas A, B and C are added to water at a specified ratio to be dissolved uniformly or dispersed so as to form an aqueous solution containing -40 wt % of the monomers. Polymerization is completed next by adding thereto an aqueous solution of an agent for initiating radical polymerization and stirring the mixture for 3-5 hours at 50°-70° C. in an atmosphere of nitrogen gas. Since the monomer shown by Formula B serves at this moment as a chain transfer agent to adjust the molecular weight, there is no sudden rise in temperature after the polymerization process is started. In other words, polymerization proceeds smoothly such that both the polymerization reaction and the molecular weight can be adjusted by simple operations. Since there is no requirement for any refinement, furthermore, a cement dispersion agent of stable quality can be obtained economically.

As emphasized above, the molecular weight of the water-soluble vinyl copolymer thus produced can be easily controlled by the ratio of the monomer shown by Formula B. The average (numerical) molecular weight (hereinafter average molecular weight converted to polyethylene glycol by the GPC method) is generally 2000-15000 and more preferably 3000-10000. If the molecular weight is too large, dispersion and fluidity tend to become too low while if the molecular weight is too small, changes with time in the dispersion and fluidity characteristics tend to occur more easily.

Cement dispersion agents of the present invention are characterized as comprising a water-soluble vinyl copolymer described above. When they are actually used, they may be used either singly or together with another agent, depending on the purpose for which use is being made. Examples of agent which may be used together include air entraining agents, accelerators, retarders, expansive admixtures and antiseptics.

Cement dispersion agents of the present invention are generally to be used at the rate of 0.01-2 wt % (by solid components) with respect to the solid cement components within a hydraulic cement composition and more preferably within the range of 0.05-0.5 wt %. If this rate is too low, dispersion and fluidity are lowered and workability is not sufficiently improved. If the rate is too high, on the other hand, there may be separations and insufficient hardening.

Cement dispersion agents of the present invention can be applicable to many kinds of hydraulic cement compositions such as concrete which contains cement, coarse and fine aggregates and water, cement pastes which include only cement and water, and mortar. The types of cement which can be used in such hydraulic cement compositions include all kinds of portland cement, fly ash cement, portand blastfurnace slag cement, portland pozzolan cement and many kinds of blended cement.

In what follows, examples of the present invention are described for more clearly explain the structure and effects of the present invention but it is not intended that the present invention be limited by these examples.

PRODUCTION OF EXAMPLE 1

Placed inside a flask with 4 openings and provided with a thermometer, a dropping funnel, a tube for introducing nitrogen gas therethrough and a stirrer were 46 parts (always by weight) of acrylic acid, 120 parts of methoxy polyethylene glycol methacrylate (molar number of ethylene oxide n=9) and 20 parts of sodium methallyl sulfonate and water (350 parts) was further added to form a uniform solution. Next, a 48% aqueous solution of sodium hydroxide (43 parts) was added to neutralize the acrylic acid. The pH value of the system after the neutralization was 7.7. After the atmosphere of the system was replaced by nitrogen, the system temperature was maintained at 55° C. by means of a warm water bath and polymerization was initiated by adding 20 parts of a 20% aqueous solution of ammonium persulfate at once. Polymerization was completed after a continuous reaction for 4 hours. Thereafter, a 48% aqueous solution of sodium hydroxide (10 parts) was added to neutralize the acid byproducts generated by the reaction described above to thereby obtain a 35 wt % aqueous solution of a vinyl copolymer (Test Example 1) with numerical average molecular weight (hereinafter always polyethylene glycol converted by the GPC method) of 4800. After 100 g of this aqueous solution of vinyl copolymer was condensed to 50 wt % by means of an evaporator, it was added into 500 ml of isopropyl alcohol to cause the copolymer to precipitate. The precipitate was filtered, washed twice with 100 ml of isopropyl alcohol and dried in vacuum to obtain a refined vinyl copolymer. Analysis of this refined vinyl copolymer showed that its carboxyl value was 179 and its sulfur content was 1.95 wt %. The weight ratios of the three monomers in the copolymer calculated from these results of analyses were 30 wt % for sodium acrylate, 10 wt % for sodium methallyl sulfonate and 60 wt % of methoxy poly(n=9)ethylene glycol methacrylate.

PRODUCTION OF EXAMPLE 7

Placed inside a flask with 4 openings and provided with a thermometer, a dropping funnel, a tube for introducing nitrogen gas therethrough and a stirrer were 67.4 parts (always by weight) of sodium methacrylate, 100 parts of methoxy polyethylene glycol methacrylate (molar number of ethylene oxide addition n=23) and 32 parts of sodium methallyl sulfonate and water (345 parts) was further added to form a uniform solution. After the atmosphere of the system was replaced by nitrogen, the system temperature was maintained at 60° C. by means of a warm water bath and polymerization was initiated by adding 20 parts of a 20% aqueous solution of ammonium persulfate at once. Polymerization was completed after a continuous reaction for 3 hours and 30 minutes. Thereafter, a 48% aqueous solution of sodium hydroxide (18 parts) was added to neutralize the acid byproducts generated by the reaction described above to thereby obtain a 35 wt % aqueous solution of a vinyl copolymer (Test Example 7) with numerical average molecular weight of 5000. The aqueous solution of vinyl copolymer thus obtained was refined as explained above in connection with the production of Example 1. Analysis showed that its carboxyl value was 182, its sulfur content was 2.9 wt % and the weight ratios of its three monomers were 35 wt% for sodiaum methacrylate, 15 wt % for sodium methallyl sulfonate and 50 wt % for methoxy poly(n=23)ethylene glycol methacrylate.

For the testing to be described below, vinyl copolymers shown in Table 1 were prepared.

TABLE 1

| Test Examples | A | | B | | C | | | | Others | | Molecular Weight |
|---|---|---|---|---|---|---|---|---|---|---|---|
| | a | b | c | d | e | f | g | h | i | j | |
| 1 | 30 | | | 10 | 60 | | | | | | 4800 |
| 2 | | 18 | | 10 | 72 | | | | | | 6200 |
| 3 | 30 | | | 10 | 60 | | | | | | 4000 |
| 4 | | 35 | | 10 | 55 | | | | | | 3500 |
| 5 | 30 | | 10 | | 60 | | | | | | 5300 |
| 6 | 30 | | | 5 | 65 | | | | | | 8500 |
| 7 | | 35 | | 15 | | | 50 | | | | 5000 |
| 8 | 20 | | | 20 | | 60 | | | | | 2700 |
| 9 | 30 | | 3 | | | | | 67 | | | 10700 |
| Comparison Examples | | | | | | | | | | | |
| 1 | 30 | | | | 70 | | | | | | 17000 |
| 2 | | 30 | | | 70 | | | | | | 16000 |
| 3 | | | | 20 | | | 80 | | | | 5500 |
| 4 | 80 | | | 20 | | | | | | | 2600 |
| 5 | | 30 | | | 65 | | | | 5 | | 16600 |
| 6 | 30 | | | 30 | 40 | | | | | | 1500 |
| 7 | | 30 | | | 60 | | | | | 10 | 22000 |

Notes:
a: Sodium acrylate
b: Sodium methacrylate
c: Sodium allylsulfonate
d: Sodium methallylsulfonate
e: Methoxy poly(n = 9)ethylene glycol methacrylate
f: Methoxypoly(n = 23)ethylene glycol methacrylate
g: Ethoxy poly(n = 15)ethylene glycol methacrylate
h: Methoxy poly(n = 12)ethylene/poly(n=3)propylene glycol methacrylate
i: Acrylic Amide
j: Sodium styrenesulfonate

METHODS OF TESTING

Each vinyl copolymer shown in Table 1 was used for concrete testing under the following conditions to measure slump and air content, their changes with time and compressive strength. The results are shown in Table 2 (for test examples) and in Tables 3 (for comparison examples).

Use was made of 320 kg/m$^3$ of normal portland cement (equal mixture of portland cement produced by Onoda Cement Kabushiki Kaisha and normal porland cement produced by Sumitomo Cement Kabushiki Kaisha), 854 kg/m$^3$ of fine aggregate (specific weiqht of 2.62) and 975 kg/m$^3$ of coarse aggregate (crushed stone with specific weight of 2.65) and the water content per unit volume of concrete was adjusted to 165 kg/m$^3$ (with water-to-cement ratio of 52%). Each cement dispersion agent to be tested was added at a rate of less than 0.60 wt % by solid component with respect to cement such that the target slump would be 21 cm. Air entraining was effected by using an air entraining agent (AE-200 or AE-300 produced by Takemoto Yushi Kabushiki Kaisha) such that the target air entraining value would be 4–6%.

Each sample (40 liter kneaded) prepared as described above was placed inside a 60-liter tilting mixer as shown in Tables 2 and 3 for kneading to make a uniform mixture at 20 rpm for 3 minutes and the slump and air content were measured immediately thereafter under the temperature and humidity conditions of 20° C. and 80% RH. Kneading was repeated subsequently at 5 rpm for 60–90 minutes and the slump and air content of a sample were measured similarly. Compressive strength of the same concrete sampled immediately after the kneading was measured one week later and again four weeks later. These measurements of slump, air content and compressive strength were taken according to JIS-A1101, JIS-A1128 and JIS-A1108.

A comparison between Tables 2 and 3 clearly shows that cement dispersion agents of the present invention can provide appropriate air contents and compressive strengths and superior dispersion and fluidity characteristics even with a small amount. Moreover, the changes with time in their dispersion and fluidity characteristics are small according to the present invention. These agents have further advantages in that they can be produced easily and economically and industrially stable quality can be obtained.

TABLE 2

| Dispersion Agent | | Immediately After | | After 60 min. | | After 90 min. | | Slump Ratio (%) | Compressive Strength (kgf/cm²) | |
|---|---|---|---|---|---|---|---|---|---|---|
| Test Examples | Addition (%) | Slump (cm) | Air (%) | Slump (cm) | Air (%) | Slump (cm) | Air (%) | | 1 Week | 4 Week |
| 1 | 0.22 | 20.8 | 4.2 | 20.1 | 4.7 | 19.0 | 3.9 | 91.3 | 292 | 430 |
| 2 | 0.24 | 21.3 | 4.0 | 20.6 | 4.0 | 18.1 | 4.3 | 85.0 | 301 | 440 |
| 3 | 0.17 | 21.7 | 4.5 | 21.3 | 4.6 | 20.8 | 4.5 | 95.9 | 305 | 445 |
| 4 | 0.20 | 21.2 | 4.9 | 20.0 | 4.7 | 18.8 | 4.3 | 89.0 | 290 | 426 |
| 5 | 0.20 | 21.4 | 4.1 | 20.2 | 4.3 | 19.7 | 4.0 | 92.1 | 287 | 422 |
| 6 | 0.28 | 21.1 | 4.6 | 20.7 | 4.2 | 19.4 | 4.7 | 91.9 | 295 | 430 |
| 7 | 0.25 | 20.9 | 4.3 | 20.2 | 4.5 | 18.9 | 4.0 | 90.3 | 298 | 434 |
| 8 | 0.22 | 21.5 | 4.8 | 20.4 | 4.9 | 18.5 | 4.7 | 86.0 | 293 | 428 |
| 9 | 0.30 | 20.5 | 4.7 | 19.8 | 4.6 | 19.1 | 4.2 | 93.1 | 288 | 425 |

Notes:
"Addition of cement dispersion agent" is by solid component with respect to cement.
"Slump ratio" means the ratio of slump after 90 minutes to slump immediately after kneading.

TABLE 3

| Dispersion Agent | | Immediately After | | After 60 min. | | After 90 min. | | Slump Ratio (%) | Compressive Strength (kgf/cm²) | |
|---|---|---|---|---|---|---|---|---|---|---|
| Comparison Examples | Addition (%) | Slump (cm) | Air (%) | Slump (cm) | Air (%) | Slump (cm) | Air (%) | | 1 Week | 4 Week |
| 1 | 0.35 | 21.3 | 4.5 | 14.6 | 4.7 | 13.8 | 4.3 | 64.8 | 275 | 410 |
| 2 | 0.30 | 21.8 | 4.8 | 16.7 | 4.7 | 14.9 | 4.6 | 68.3 | 270 | 403 |
| 3 | 0.60 | 20.7 | 4.7 | 12.6 | 4.5 | 10.1 | 4.2 | 48.8 | 272 | 407 |
| 4 | 0.50 | 21.2 | 4.2 | 11.8 | 4.2 | 9.8 | 4.3 | 36.2 | 253 | 373 |
| 5 | 0.30 | 21.3 | 4.7 | 17.4 | 4.6 | 14.5 | 4.4 | 68.1 | 278 | 418 |
| 6 | 0.27 | 21.9 | 4.1 | 15.6 | 4.1 | 10.3 | 4.3 | 47.0 | 279 | 420 |
| 7 | 0.45 | 21.5 | 4.3 | 16.3 | 4.1 | 15.9 | 4.0 | 75.6 | 280 | 421 |
| 8 | 0.50 | 21.3 | 4.8 | 14.1 | 4.5 | 12.0 | 4.1 | 56.3 | 299 | 440 |
| 9 | 0.50 | 21.8 | 4.9 | 12.3 | 4.1 | 10.8 | 3.8 | 49.5 | 302 | 443 |
| 10 | 0.40 | 21.2 | 4.7 | 12.5 | 4.2 | 11.5 | 3.6 | 54.2 | 301 | 441 |

Notes:
Cement dispersion agent for Comparison Example 8 is lignin sulfonate.
Cement dispersion agent for Comparison Example 9 is condensation product of naphthalene sulfonic acid and formaldehyde.
Cement dispersion agent for Comparsion Example 10 is condensation product of melamine sulfonic acid and formaldehyde.

What is claimed is:

1. A method of providing fluidizing property to a hydraulic cement composition comprising the step of adding a cement dispersion agent to said composition by 0.01-2 wt % with respect to the solid cement component of said composition, said cement dispersion agent comprising a water-soluble vinyl copolymer which is obtainable by copolymerization of at least first monomer shown by Formula A given below, second monomer shown by Formula B given below and third monomer shown by Formula C at copolymerization ratio of 10-50/3-25/80-40 by weight:

$$CH_2=\underset{\underset{R^1}{|}}{C}-COOM^1 \quad (A)$$

$$CH_2=\underset{\underset{R^2}{|}}{C}-CH_2SO_3M^2 \quad (B)$$

$$CH_2=\underset{\underset{R^3}{|}}{C}-COO(CH_2CHO)_n R^5 \quad (C)$$
$$\phantom{CH_2=C-COO(CH_2C}\underset{R^4}{|}$$

where $R^1$, $R^2$, $R^3$ and $R^4$ are H or $CH_3$, $R^5$ is alkyl group with 1-3 carbon atoms, $M^1$ and $M^2$ are alkali metal, alkali earth metal, ammonium or organic amine, and n is an integer in the range 5-25.

2. The method of claim 1 wherein the numerical average molecular weight of said water-soluble vinyl copolymer is 2000-15000.

3. The method of claim 1 wherein said third monomer shown by Formula C is methoxy poly(n=9)ethylene glycol methacrylate.

4. The method of claim 2 wherein said third monomer shown by Formula C is methoxy poly(n=9)ethylene glycol methacrylate.

5. The method of claim 1 wherein said third monomer shown by Formula C is methoxy poly(n=23)ethylene glycol methacrylate.

6. The method of claim 2 wherein said third monomer shown by Formula C is methoxy poly(n=23)ethylene glycol methacrylate.

7. The method of claim 3 wherein said first monomer shown by Formula A is sodium methacrylate and said second monomer shown by Formula B is sodium methallyl sulfonate.

8. The method of claim 4 wherein said first monomer shown by Formula A is sodium methacrylate and said second monomer shown by Formula B is sodium methallyl sulfonate.

9. The method of claim 5 wherein said first monomer shown by Formula A is sodium methacrylate and said second monomer shown by Formula B is sodium methallyl sulfonate.

10. The method of claim 6 wherein said first monomer shown by Formula A is sodium methacrylate and said second monomer shown by Formula B is sodium methallyl sulfonate.

11. The method of claim 1 wherein said hydraulic cement composition is concrete.

12. The method of claim 1 wherein said hydraulic cement composition is a cement paste.

13. The method of claim 1 wherein said hydraulic cement composition is mortar.

* * * * *